United States Patent
Cramer et al.

(10) Patent No.: US 6,844,104 B2
(45) Date of Patent: Jan. 18, 2005

(54) VENT PLUG SYSTEM FOR STORAGE BATTERIES

(75) Inventors: Wilhelm Cramer, Brilon (DE);
Eberhard Nann, Soest (DE); Manfred Hülscher, Ritterhude (DE)

(73) Assignee: Accumulatorenwerke Hoppecke Carl Zoellner & Sohn GmbH & Co. KG (DE)

( * ) Notice: Subject to any disclaimer, the term of this patent is extended or adjusted under 35 U.S.C. 154(b) by 513 days.

(21) Appl. No.: 09/990,709

(22) Filed: Nov. 21, 2001

(65) Prior Publication Data

US 2002/0064705 A1 May 30, 2002

(51) Int. Cl.[7] .................................................. H01M 2/12
(52) U.S. Cl. .............................. 429/53; 429/55; 429/57; 429/82
(58) Field of Search .............................. 429/53, 55, 57, 429/82

(56) References Cited

U.S. PATENT DOCUMENTS

| | | | |
|---|---|---|---|
| 2,452,066 A | 10/1948 | Murphy | |
| 3,394,035 A | 7/1968 | Cox et al. | |
| 3,508,972 A | 4/1970 | Goldingay | |
| 3,597,280 A | 8/1971 | Hennen | |
| 3,630,788 A | 12/1971 | Hennen | |
| 3,723,188 A | 3/1973 | Hennen | |
| 3,846,178 A | 11/1974 | Evjen et al. | |
| 3,879,227 A | 4/1975 | Hennen | |
| 3,915,753 A | 10/1975 | Melone | |
| 3,944,437 A | 3/1976 | Auerbach | |
| 4,009,322 A | 2/1977 | Wolf | |
| 4,029,855 A | 6/1977 | Dougherty et al. | |
| 4,052,534 A | 10/1977 | Devitt | |
| 4,086,395 A | 4/1978 | Heiser et al. | |
| 4,091,180 A | 5/1978 | Fox et al. | |
| 4,098,963 A | 7/1978 | Mocas | |
| 4,117,205 A | 9/1978 | Kitai | |
| 4,233,370 A | 11/1980 | Heiser et al. | |

(List continued on next page.)

FOREIGN PATENT DOCUMENTS

| | | |
|---|---|---|
| DE | 1 905 215 | 8/1970 |
| DE | 1 906 191 | 8/1970 |
| DE | 4032858 | 10/1990 |
| DE | 19527526 | 7/1995 |
| EP | 0 501 709 A1 | 9/1992 |
| EP | 0756338 | 7/1996 |
| EP | 0920063 | 9/1998 |
| FR | 2 153 702 | 5/1973 |
| GB | 913 125 | 12/1962 |
| GB | 1 599 755 | 10/1981 |

*Primary Examiner*—Michael Barr
*Assistant Examiner*—Saeed Chaudhry
(74) *Attorney, Agent, or Firm*—Foley & Lardner LLP

(57) ABSTRACT

To improve on a vent plug system for a cell opening of a storage battery containing a plug element with an inner cartridge and a valve element, to where it is possible without the need for maintaining excessive physical tolerances to assemble it with a minimal number of components m simple fashion while still assuring reliable operation without any major effort, the plug element is provided as a cup-shaped unit with an outer contour shaped to fit into, and seal, the cell opening, with an internal cavity and with a gas port between the cavity and an outside surface. The inner cartridge is essentially cylindrical, has an outer contour shaped to permit insertion in the cavity of the plug element and is provided with a gas passage that opens into the cavity, while the valve element is a separate element retainable in the cavity by the inner cartridge and, as a function of the gas pressure, establishes a gas-flow connection between the gas passage of the inner cartridge and the gas port of the plug element. The inner cartridge and the plug element can be joined in gas-tight fashion, and the inner cartridge features an installation fitting which in the assembled state of the system protrudes at least partially from the cavity of the plug element.

9 Claims, 4 Drawing Sheets

U.S. PATENT DOCUMENTS

| | | |
|---|---|---|
| 4,278,742 A | 7/1981 | Oxenreider et al. |
| 4,306,002 A | 12/1981 | Heiser et al. |
| 4,328,290 A | 5/1982 | Szymborski et al. |
| 4,338,383 A | 7/1982 | Jutte et al. |
| 4,348,466 A | 9/1982 | Elehew et al. |
| 4,371,591 A | 2/1983 | Oxenreider et al. |
| 4,394,423 A | 7/1983 | Ledjeff |
| 4,409,302 A | 10/1983 | Poe |
| 4,447,508 A | 5/1984 | Jensen |
| 4,460,661 A | 7/1984 | Sköld |
| 4,463,069 A | 7/1984 | Greenlee |
| 4,562,126 A | 12/1985 | Chartrain et al. |
| 4,751,154 A | 6/1988 | Binder et al. |
| 4,778,735 A | 10/1988 | Shestok et al. |
| 4,851,305 A | 7/1989 | Kump et al. |
| 4,916,034 A | 4/1990 | Hulsebus et al. |
| 5,132,175 A | 7/1992 | Mrotek et al. |
| 5,162,164 A | 11/1992 | Dougherty et al. |
| 5,217,823 A | 6/1993 | Geibl et al. |
| 5,258,242 A * | 11/1993 | Dean et al. .................... 429/54 |
| 5,278,003 A | 1/1994 | Francisco |
| 5,284,720 A | 2/1994 | Thuerk et al. |
| 5,380,604 A | 1/1995 | Hampe et al. |
| 5,424,146 A | 6/1995 | Lin |
| 5,549,986 A | 8/1996 | Heiman et al. |
| 5,554,455 A * | 9/1996 | Inoue et al. ................... 429/53 |
| 5,688,612 A | 11/1997 | Mrotek et al. |
| 5,702,841 A | 12/1997 | Thomas et al. |
| 5,856,037 A | 1/1999 | Casale et al. |
| 6,025,086 A | 2/2000 | Ching |
| 6,051,332 A * | 4/2000 | Verhoog et al. ............... 429/54 |
| 6,143,438 A | 11/2000 | Geibl et al. |
| 6,277,517 B1 | 8/2001 | Thomas et al. |
| 6,461,758 B1 | 10/2002 | Geibl et al. |

\* cited by examiner

VENT PLUG SYSTEM FOR STORAGE BATTERIES

FIELD OF THE INVENTION

This invention relates to a vent plug system for the cell opening of a storage battery, with a plug element incorporating an inner cartridge and a valve element.

DESCRIPTION OF THE RELATED ART

Similar plug systems have been known in prior art. The individual cells especially of recombination-type storage batteries have openings, usually threaded, and the pressure-activated valve permits the bleeding-off of built-up gases while preventing leakage or evaporation and, conversely, the undesirable entry of the outside atmosphere into the battery cell.

U.S. Pat. No. 4,052,534 describes a plug system in which a cup-shaped plug element serves to accommodate an elastic, slotted valve plate and an insert supporting the valve plate, both held by an additional cartridge which is itself connected to the plug element. A similar system is also described in DE 40 32 858, where, in addition to the aforementioned components such as the plug element, insert, valve plate and cartridge a complex valve-head disk is employed. As a feature inherent in the design, these earlier vent plug systems are quite long and necessarily involve a large number of components which require precise matching and complicated assembly in order to ensure reliable operation.

An enhanced version is described in DE 195 27 526, where a plug element accommodates an insert with a valve seat and associated valve. To keep the design compact, the insert with valve seat and valve element is housed in the cup-shaped plug element in such fashion that it is completely enclosed by the plug element without protruding from the latter. This requires a gas-tight connection between the insert and the plug element, i.e. between the outer perimeter of the insert and the inner circumference of the plug element. The individual components must be fabricated within very stringent tolerances and involve complex assembly since the insert can be forced in only to where it is flush with the plug element. In this case the respective lower front ends of the plug element and of the insert are in flush alignment on the same plane. Pushing the insert deeper would require a special tool. This makes the device and its assembly an uneconomical proposition. Yet if in the said flush position the contact needed for the operation of the valve is not attained, the valve element is not properly positioned and its functionality is no longer assured. Also, forcing the insert into the plug element involves mechanical impact on the plug element which can easily cause damage to its lower, open end face. This earlier design requires the matching of numerous components within precise tolerances as well as complex assembly operations in fitting these components together in exactly the right relative positions, all without damaging the plug element in any way and without compromising a gas-tight connection between the inner module and the plug element along their circumferential mating surfaces.

SUMMARY OF THE INVENTION

This invention to introduce an improved vent plug system of the type described whereby, without the need for excessive production tolerances, the smallest possible number of components can be combined, easily, cost-effectively and with a minimum of assembly operations, into a system that ensures reliable operation. As an overall requirement, this improved vent plug design is intended to reduce the cost involved in producing the system.

With industrially mass-produced elements of this nature, even minute simplifications in the fabrication and assembly of their components add up to substantial, significant cost savings.

The vent plug system includes a plug element that is cup-shaped with an outer contour adapted for insertion into, and sealing of, the cell opening. The plug element contains an internal cavity and a gas-port connection between the cavity and the outside. The inner cartridge is essentially cylindrical with an outer contour adapted for insertion in the cavity of the plug element and with a gas passage extending into the cavity. The valve element is designed as a separate element that can be mounted in the cavity and held in position by the inner cartridge and which, as a function of the gas pressure, establishes a gas-flow connection between the gas passage of the inner cartridge and the gas port of the plug element. The inner cartridge and the plug element can be joined in gas-tight fashion, and, when the system is assembled, the inner cartridge protrudes at least partially from the cavity of the plug element with an installation fitting.

According to the invention, the inner cartridge is provided with an installation fitting by means of which it is possible to position the plug element in simple fashion and without compromising it due to any pressure applied during the assembly, to position the inner cartridge appropriately and, applying a certain force, to mount it along a specific path in a defined position relative to the plug element, with the installation fitting being the only point where force is applied. When the system is properly assembled, the installation fitting protrudes from the plug element. While this makes the axial length of the plug element slightly longer, the advantages derived in the fabrication and assembly make up for that. This protrusion is minor and does not negatively affect universal suitability of the vent plug system.

Compared to prior art, these components do not have to be fabricated within such stringent production tolerances since the installed position is not derived from an alignment of specific parts of the inner cartridge, for instance its end face, relative to specific parts of the plug element, for instance its end face, but merely from the application of a predefined force and/or via a predefined path on the installation fitting of the inner cartridge after it was set up in its insertion position relative to the plug element. Moreover, there is no need for expensive assembly devices that would serve to drive the inner cartridge into the plug element for instance to or even beyond the flush level.

The solution per this invention involves only three components that must be produced separately and may be individually varied depending on their intended functionalities. These three components are positioned in alignment with one another and then secured in place. By virtue of an installation fitting on the inner cartridge, which, when installed, protrudes axially from the plug element, it is possible to implement a gas-tight connection between the inner cartridge and the plug element around the lower end faces of both elements. According to one advantageous provision of the invention, the two elements, i.e. the plug element and the inner cartridge, are welded together in the area of their lower end faces. In particularly desirable fashion the installation fitting is annular in design and concentrically surrounded by an outer ring which, after the inner cartridge has been installed in the plug element, is fused onto the end face of, and thus welded onto, the plug element. A design of this nature further reduces the tolerance requirements in production. Welded together in the area of their mating circumferential surfaces, the inner cartridge and the plug element are thus connected in gas-tight fashion, while the actual functional surfaces of the plug element, meaning the gas passage and the valve-element backstop on the end face of the inner cartridge inserted in the plug element, are unaffected by this connection.

In desirable fashion, the installation fitting and the connecting ring may be annular in design or in the form of ring segments whereby individual sectional projections can assume the same function.

What is important is that the force applied when the inner cartridge is inserted allows axially straight insertion of the cartridge in the plug element and that the weldment on the perimeter ensures an adequately strong and gas-tight connection with the end face of the plug element.

In advantageous fashion the cavity in the plug element is provided with a backstop for the inner cartridge, so that the inner cartridge can be inserted only to a predefined stop position. The invention also provides for a barrier, i.e. a contact surface for the valve element. That contact surface may be situated on the inner front end of the cavity and preferably in the center thereof. The valve element, essentially disk-shaped, can rest against the contact surface, so that the end face of the inserted inner cartridge butts against the valve element, pressing it against the contact surface. The insertion of the valve element thus takes place in a defined position and with a defined amount of thrust. The valve element is preferably provided with a resilient valve lip which is movable as a function of the gas pressure. According to a desirable provision of the invention the essentially disk-shaped valve element rests against the end face of the inner cartridge and the contact surface of the plug element pushes it in gas-tight fashion against the end face of the inner cartridge. The valve lip may be an integral part of a surface segment of the valve element, responding to a certain gas pressure by establishing the gas-flow connection between the gas passage of the inner cartridge and the gas port of the plug element, allowing gas to escape into the atmosphere.

The plug element and the inner cartridge and perhaps even the valve element may be produced by the injection-molding process. In this context, the invention provides for the sprues to be located outside the sealing and other functional surfaces.

This invention thus introduces a simple vent plug system which consists of a minimum of individual components, separately manufacturable without the need for stringent tolerances and permitting easiest possible assembly. The valve element can be attached to the contact surface in the plug element which contact surface doubles as a counter-support for the valve. After the inner cartridge is aligned in its insertion position, a simple drive mandrel without any particular contouring other than its compatibility with the plug design, for instance a simple, flat ram, can be used to apply pressure on the installation fitting until the inner cartridge is properly positioned within the plug element and its front end extending into the cavity of the plug element rests in gas-tight fashion against the valve element. The backstop inside the plug element limits the depth of insertion. Apart from that, the drive-in depth depends only on the amount of force applied over a specific distance, so that in the assembly process any special characteristics of the individual components can be flexibly accommodated. After the inner cartridge has been driven in, a gas-tight junction is established between the outer, exposed front end of the plug element and the inner cartridge, preferably with the aid of material projections on the installation fitting or of specially incorporated sealing sections on the inner cartridge. Once the seal is established, the outside surface of the installation fitting serves no further purpose, so that any external damage due to the forced insertion or to the welding is of no negative consequence. To be sure, during the operation of the plug system the installation fitting protruding downward from it serves to return the fluid, i.e. to direct the drip flow, whereby drip-off fluid is returned to the cell in simple and reliable fashion. This function, however, is not compromised by any external changes of or damage to the installation fitting on its end face or outer surface.

This invention permits substantial cost savings in the production and assembly of the individual components of a vent plug system, the result being not only significant cost-effectiveness but technical simplification as well especially in terms of less stringent tolerance requirements and the assembly process in general, given that no special assembly tools or procedures are necessary.

BRIEF DESCRIPTION OF THE DRAWINGS

Other advantages and features of this invention will be evident from the following description with reference to the drawings in which.

DETAILED DESCRIPTION

Figure 1:
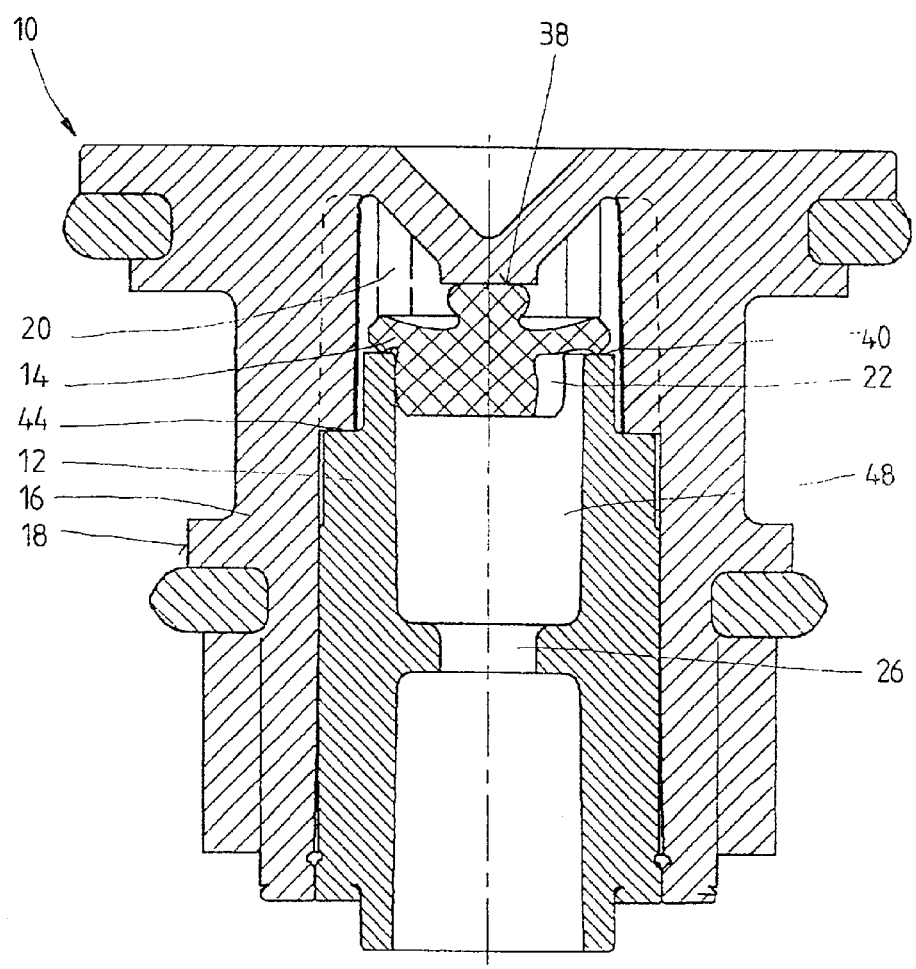
FIG. 1 shows a vent plug system incorporating an inner cartridge, positioned in a plug element and welded gas-tight, as well as a valve element.
Figure 2:
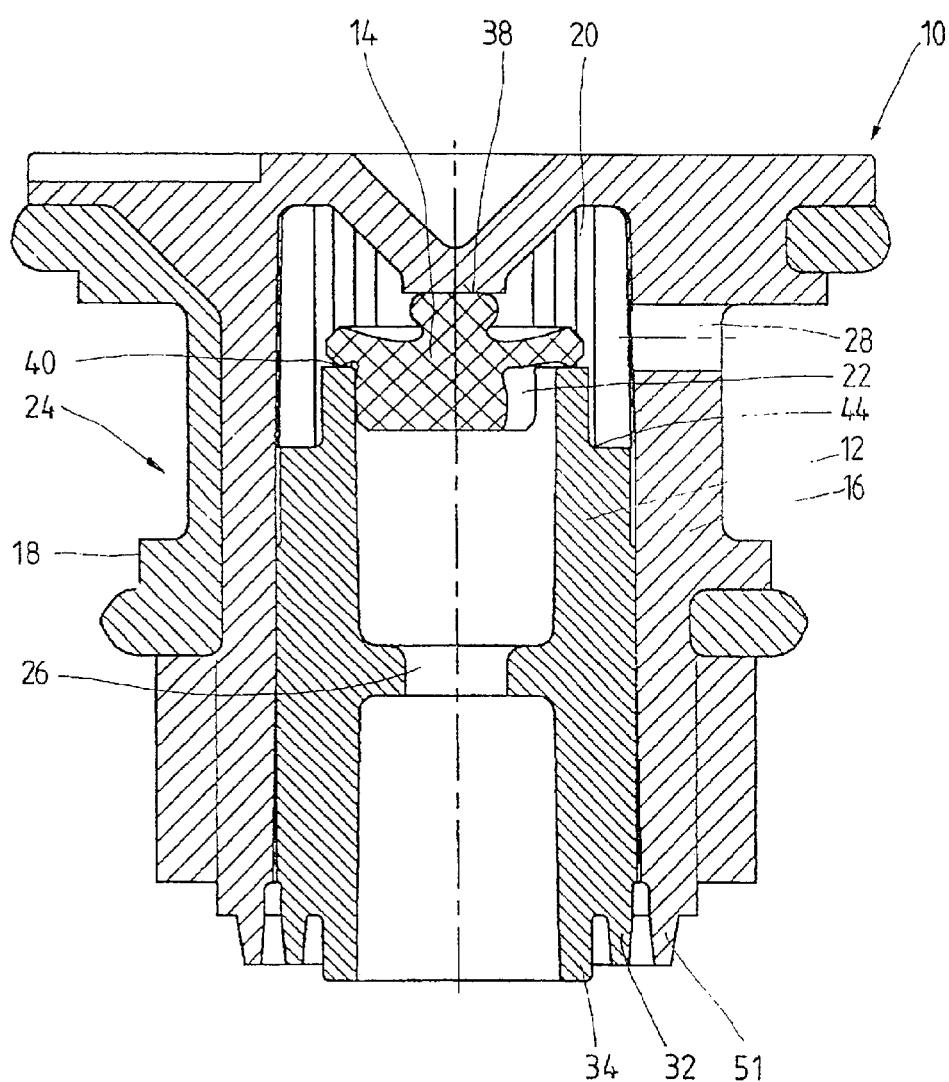
FIG. 2 illustrates the vent plug system per FIG. 1 prior to the welding of the inner cartridge.
Figure 3:
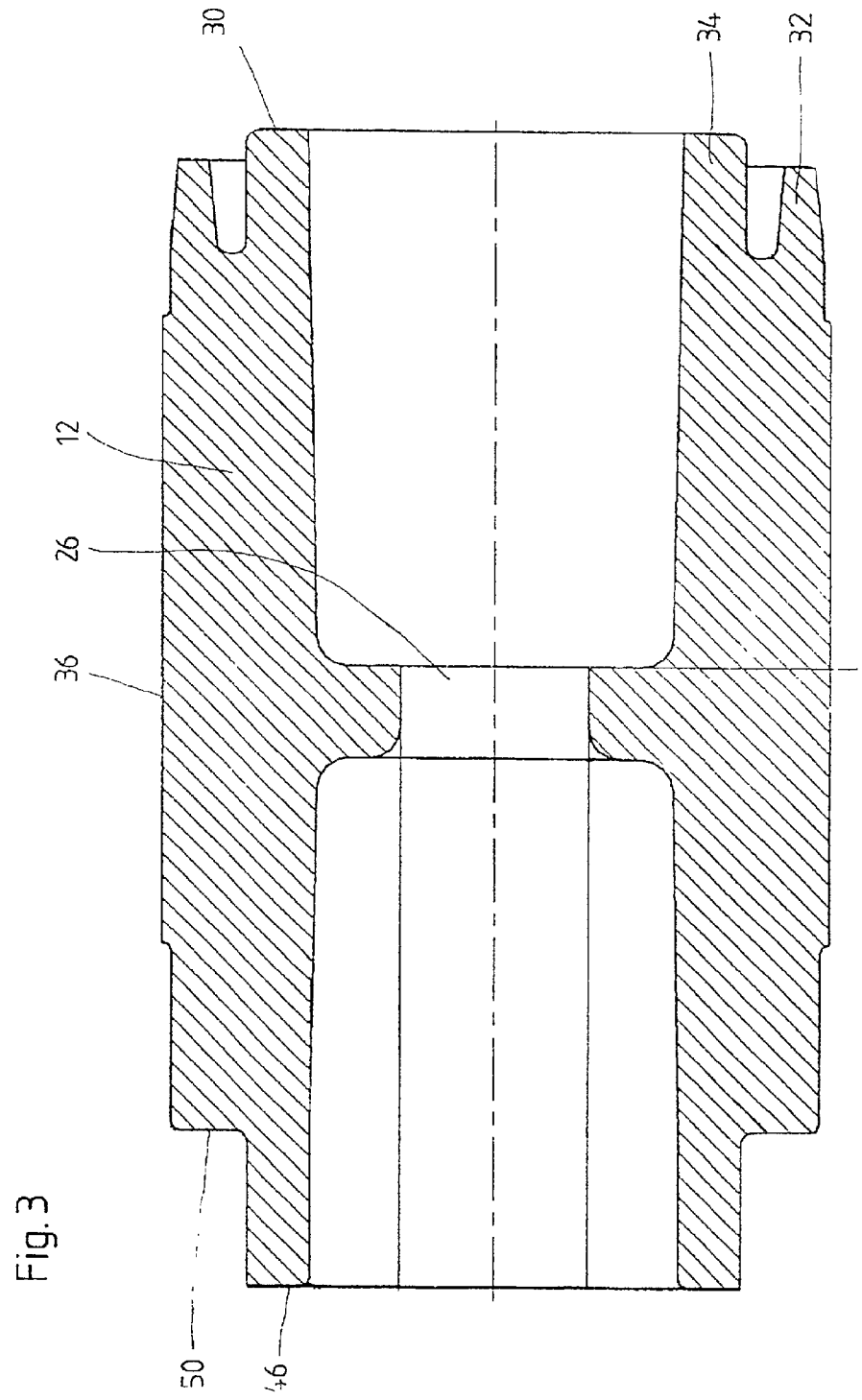
FIG. 3 depicts the inner cartridge contained in the vent plug system per FIG. 1.

FIG. 1 illustrates a vent plug system 10 for the cell opening of a storage battery, not shown, with a plug element 16 incorporating an inner cartridge 12 and a valve element 14. The plug element 16 is cup-shaped, with an outer contour 18 adapted for insertion in and sealing of the cell opening, an internal cavity 20 and a gas port 28 between the cavity 20 and the outside surface 24 (FIG. 2). The inner cartridge 12 is cylindrical, with an outer contour 36 (FIG. 3) matching the shape of the cavity 20 of the plug element 16, and with a gas passage 26 that opens into the cavity 20.

The valve element 14 is designed as a separate entity held in place in the cavity 20 by the inner cartridge 12. As a function of the gas pressure, it establishes a gas-flow connection 22 between the gas passage 26 of the inner cartridge 12 and the gas port 28 of the plug element 16.

The inner cartridge 12 and the plug element 16 are joined in gas-tight fashion. When the inner cartridge is installed, an installation fitting 30 (FIG. 3) partly protrudes from the cavity 20 of the plug element 16.

Figure 4:
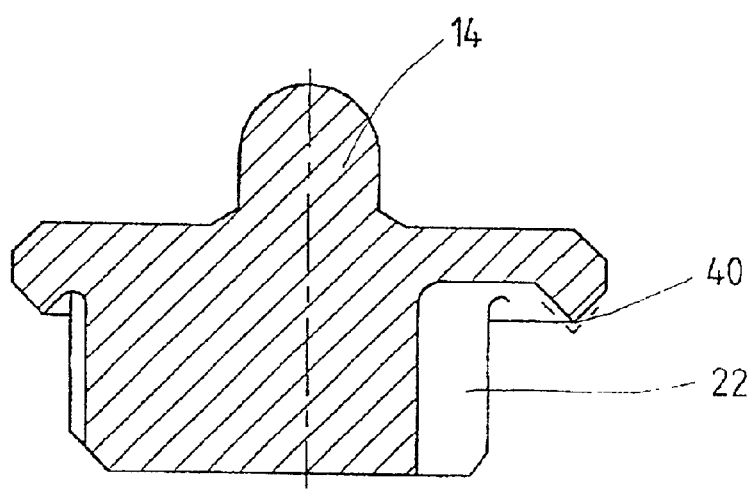
FIG. 4 shows the valve element contained in the vent plug system per FIG. 1.

The installation fitting 30 is constituted of the inside of two concentrically positioned annular elements 32, 34. The outer ring 32 is welded to the plug element 16 which is provided with a corresponding annular rim 51. In the direction of the valve element 14, the inner cartridge 12 features a recess 50 (FIG. 3) which, in the assembled state of the system, butts against a backstop shoulder 44 of the plug element 16. The plug element 16 contains a valve countersupport 38 as a stop for the valve body 14. The valve body 14 features a pressure-responsive, movable valve lip 40 (FIG. 4) which in conjunction with the end face 46 of the inner cartridge 12 constitutes a valve. The plug element 16 and the inner cartridge 12 are injection-molded components whose sprues are located outside the functional surfaces. In the assembly process, the valve element 14 is axially introduced through the bore 48 of the inner cartridge 12.

By way of the installation fitting 30, with its pressure point constituted of its circular end face, the inner cartridge 12 can be pressed into the plug element 16 using a tool with only a minor positioning effort. Prior to that the valve element 14 may be placed in the plug element 16 or on the inner cartridge 12. There are no particularly stringent tolerance requirements for the tool or for the components because, after the inner cartridge 12 has reached its end position in the plug element 16, the installation fitting 30 still protrudes from the plug element 16. On their part, axial tolerances of the components can be compensated for to an extent since the inner cartridge 14 is inserted all the way to the defined backstop 44.

In this manner, the valve element 14 is in a functionally important, defined state by virtue of a defined force acting on it. This state also determines the gas discharge pressure at the opening of the valve constituted of the front end 46 of the inner cartridge 12 and the valve lip 40 of the valve element 14. Assembly-related damage and any corresponding effect on the function of the valve is thus minimized.

Considering the individual features, the expert will arrive at additional practical combinations.

What is claimed is:

1. Vent plug system, for a cell opening of a storage battery comprising: a plug element incorporating an inner cartridge and a valve element, said plug element being cup-shaped and having a first outer contour designed for insertion in and sealing of the cell opening, with an interior cavity and with a gas port between said cavity and an outside, said inner cartridge being essentially cylindrical and having a second outer contour designed for insertion in the cavity of the plug element and including a gas passage that opens into said cavity, while the valve element is designed as a separate entity which can be locked in place in the cavity by the inner cartridge and which as a function of the gas pressure establishes a gas-flow connection between the gas passage of the inner cartridge and the gas port of the plug element, the inner cartridge and the plug element can be joined in gas-tight fashion and the inner cartridge is provided with an installation fitting which in the assembled state of the system protrudes at least partly from the cavity of the plug element, wherein the installation fitting consists of two concentrically positioned annular elements.

2. Vent plug system as in claim 1, wherein the annular elements are in the form of ring segments.

3. Vent plug system as in claim 2, wherein the ring segments include an inner segment and an outer segment, the outer segment can be welded to the plug element.

4. Vent plug system as in claim 1, wherein the plug element is provided with a backstop for the inner cartridge.

5. Vent plug system as in claim 1, wherein the plug element is provided with a valve countersupport.

6. Vent plug system as in claim 1, wherein the valve element includes a pressure-responsive, movable valve lip.

7. Vent plug system as in claim 1, wherein the plug element and the inner cartridge are injection-molded components.

8. Vent plug system as in claim 7, wherein sprues of the injection-molded components are located outside the sealing and other functional surface areas.

9. Vent plug system as in claim 1, wherein the installation fitting is ring-shaped.

* * * * *